US006993419B2

(12) United States Patent
D'Ouince et al.

(10) Patent No.: US 6,993,419 B2
(45) Date of Patent: Jan. 31, 2006

(54) PROCESS AND DEVICE FOR DETECTING THE FAILURE OF A PRESSURE SENSOR OF AN AIR DATA SYSTEM OF AN AIRCRAFT

(75) Inventors: Arnaud D'Ouince, Toulouse (FR); Bruno Ley, Sainte Foy de Peyrolieres (FR); Philippe Gaucheron, Fontenilles (FR); Arnaud Bellier, Toulouse (FR)

(73) Assignee: Airbus France, Toulouse (FR)

( * ) Notice: Subject to any disclaimer, the term of this patent is extended or adjusted under 35 U.S.C. 154(b) by 166 days.

(21) Appl. No.: 10/704,650

(22) Filed: Nov. 12, 2003

(65) Prior Publication Data

US 2004/0111193 A1   Jun. 10, 2004

(30) Foreign Application Priority Data

Nov. 27, 2002   (FR) .................................. 02 14871

(51) Int. Cl.
*G06F 7/00* (2006.01)
(52) U.S. Cl. .............................. 701/3; 701/29; 701/34; 340/945
(58) Field of Classification Search ................ 701/3, 701/4, 7–9, 29, 33, 34; 244/75 R, 194; 340/945, 340/963, 969, 970
See application file for complete search history.

(56) References Cited

U.S. PATENT DOCUMENTS 5,796,612 A * 8/1998 Palmer ........................ 701/4
6,232,890 B1   5/2001 Berlioz et al.

FOREIGN PATENT DOCUMENTS

EP        0393730        10/1990

OTHER PUBLICATIONS

Preliminary Search Report dated Oct. 13, 2003.

* cited by examiner

*Primary Examiner*—Yonel Beaulieu
(74) *Attorney, Agent, or Firm*—Stevens, Davis, Miller & Mosher, LLP

(57) ABSTRACT

Detection of the failure of a pressure sensor of an air data system of an aircraft having at least two pressure sensors includes measuring first and second pressure values with the aid of the two pressure sensors, respectively. The deviation between the first and second pressure values is calculated, and this deviation is compared with a predetermined threshold value. If the deviation is greater than the threshold value, a failure cue relating to the air data system is displayed on a display device that is mounted in the aircraft.

16 Claims, 3 Drawing Sheets

PROCESS AND DEVICE FOR DETECTING THE FAILURE OF A PRESSURE SENSOR OF AN AIR DATA SYSTEM OF AN AIRCRAFT

FIELD OF THE INVENTION

The present invention relates to a process and a device for detecting the failure of a pressure sensor of an air data system of an aircraft, which comprises at least two pressure sensors.

BACKGROUND OF THE RELATED ART

It is known that such an air data system is intended for measuring air data making it possible to determine values of parameters such as the altitude of the aircraft, its speed, etc. For this purpose, said air data system comprises pressure sensors that are connected by tubes to probes that pass through the fuselage of the aircraft.

Generally, a civil transport airplane comprises three air data systems of this type, of which:
- a first provides data which are displayed in the cockpit, for the attention of the pilot;
- a second provides data which are also displayed in the cockpit, but for the attention of the co-pilot; and
- a third is used as backup to cope if necessary with the failure of one of said first two systems.

For obvious safety reasons, these three air data systems must be made and must operate in a manner which is completely independent of one another, since otherwise the failure of one would have repercussions on the measurements of the other systems.

Moreover, it is known that human errors, in particular during airplane maintenance operations, may give rise to the failure of one or more of the pressure sensors of such an air data system.

For example, the personnel in charge of performing an operation of washing the airplane frequently stick a piece of adhesive tape onto each of the probes of the air data system, so as to prevent water from penetrating into the tube during said washing. If they forget to remove one of said pieces of adhesive tape after the washing, the corresponding pressure sensor will fail during the next flight of the airplane, since it will be unable to measure the pressure of the air outside the fuselage. It will in fact measure the pressure of the air in the tube which is closed, at its end on the probe side, by the adhesive piece.

Another exemplary failure relates to the case where maintenance personnel disconnect the tube and the pressure sensor at the level of an appropriate connector, so as for example to clean the inside of this tube. If they forget to reconnect the tube to the pressure sensor after carrying out the maintenance operation, said pressure sensor will also fail, since it will measure the pressure of the air inside the fuselage instead of measuring the pressure of the air outside the fuselage.

SUMMARY OF THE INVENTION

The object of the present invention is to remedy these drawbacks. It relates to a process for detecting, in a rapid and reliable manner, and at a reduced cost, the failure of a pressure sensor of an air data system of an aircraft, which comprises at least two pressure sensors.

For this purpose, said process is noteworthy, according to the invention, in that at least the following first series of steps is carried out:

A1) pressure measurements are made with the aid of said two pressure sensors so as to obtain, respectively, first and second pressure values;
A2) the deviation between said first and second pressure values is calculated;
A3) this deviation is compared with a predetermined threshold value, for example 30 mbar; and
A4) if said deviation is greater than said threshold value, a failure cue relating to said air data system is displayed on a display device which is mounted on said aircraft.

Thus, by virtue of said first series of steps A1) to A4), any failure of a pressure sensor of an air data system can be rapidly and reliably detected, without calling upon information external to this air data system, such as for example information output by other air data systems of the aircraft. This therefore makes it possible, should a plurality of air data systems be present on the aircraft, to guarantee the strict mutual independence of the various air data systems of the aircraft.

Advantageously, the following steps are moreover carried out:
- the speed of the aircraft relative to the air is measured in such a way as to obtain an air speed value;
- the air speed value thus measured is compared with a predetermined speed threshold; and
- a failure cue is displayed in step A4), [of the aforesaid first series of steps A1) to A4)] only if said air speed value is greater than said speed threshold.

This has the advantage that a failure of said air data system is not signaled in an untimely manner when the aircraft is subjected on the ground to a side wind causing a considerable difference between the pressures measured by the pressure sensors situated at different places on the fuselage, in particular in the right part and in the left part of the fuselage. This predetermined speed threshold, for example 25 m/s (around 50 knots), is chosen, preferably, so that the effect of a side wind corresponding to a wind of maximum intensity does not give rise to the unjustified signaling of a failure during takeoff of the aircraft.

Furthermore, in a particular implementation:
- at least three pressure sensors are provided for said air data system;
- in step A1), pressure measurements are made with the aid of said three pressure sensors;
- in step A2), all the possible deviations between the various pressure values taken pairwise are calculated;
- in step A3), all the deviations thus calculated are compared with said threshold value; and
- in step A4), a failure cue is or is not displayed depending on the various comparisons thus carried out.

More precisely, in said step A4), a failure cue is displayed:
- in a first variant, if at least one of said deviations is greater than said threshold value; and
- in a second variant, only if all the deviations are greater than said threshold value.

Moreover, the process in accordance with the invention is also noteworthy in that at least the following second series of steps is moreover carried out:

B1) pressure measurements are made with the aid of at least one pressure sensor of the air data system, on the aircraft which is on the ground and the cabin of which is not pressurized, so as to obtain a third pressure value;
B2) on the basis of this third pressure value, a first altitude corresponding to the ground altitude is calculated;
B3) the cabin of the aircraft is pressurized;
B4) the aircraft is made to take off;

B5) at a predetermined time after takeoff, pressure measurements are made with the aid of said pressure sensor so as to obtain a fourth pressure value;

B6) on the basis of this fourth pressure value, a second altitude corresponding to the aircraft's altitude is calculated at the aforesaid instant;

B7) a third altitude corresponding to the aircraft's altitude with respect to the ground is calculated, from said first and second altitudes;

B8) said third altitude is compared with a predetermined altitude threshold; and B9) if said third altitude is less than said predetermined altitude threshold, a failure cue relating to said air data system is displayed on a display device which is mounted on said aircraft.

This second series of steps B1) to B9) has the advantage of allowing the detection of the simultaneous failure of several pressure sensors of one and the same air data system. It may for example be deployed by an alarm signaling/monitoring facility provided on the aircraft.

Furthermore, advantageously, in the case of an aircraft fitted with at least two engines, said altitude threshold is less than the altitude reached by the aircraft, at said predetermined time after takeoff, should there be a fault with at least one of said engines. In this case, preferably, said predetermined time after takeoff is substantially equal to 30 seconds, and said altitude threshold is substantially equal to 30 meters (around 100 feet).

Moreover, advantageously, the following steps are moreover carried out:

the operation of the engines of the aircraft is monitored; and when a malfunction of at least one of the engines of the aircraft is detected, a failure cue is not displayed if appropriate in the aforesaid step B9).

The process in accordance with the invention is also noteworthy in that at least the following third series of steps is moreover carried out:

C1) at least one detector which is able to detect a failed coupling between the corresponding pressure sensor and a probe of said air data system, which is associated with this pressure sensor, is provided on at least some of the pressure sensors;

C2) the acquisition on the ground, before takeoff, of cues relating to said coupling, which emanate from said detectors, is carried out; and C3) if at least one of said detectors signals a failed coupling, a failure cue relating to said air data system is displayed on a display device which is mounted on the aircraft.

Preferably, at least one of said detectors is integrated into a pneumatic connector intended to join a pneumatic tube associated with a probe to the corresponding pressure sensor.

The present invention also relates to a device for detecting the failure of a pressure sensor of an air data system of an aircraft, which comprises at least two pressure sensors.

According to the invention, said device is noteworthy in that it comprises:

means for acquiring the values of measurements made by said pressure sensors;

means of calculation;

means of comparison;

means of selection; and means of display able to display, on at least one display device which is mounted on said aircraft, a failure cue relating to said air data system.

BRIEF DESCRIPTION OF THE DRAWINGS

The figures of the appended drawing will elucidate the manner in which the invention may be implemented. In these figures, identical references designate similar elements.

DETAILED DESCRIPTION OF THE INVENTION

Figure 1:
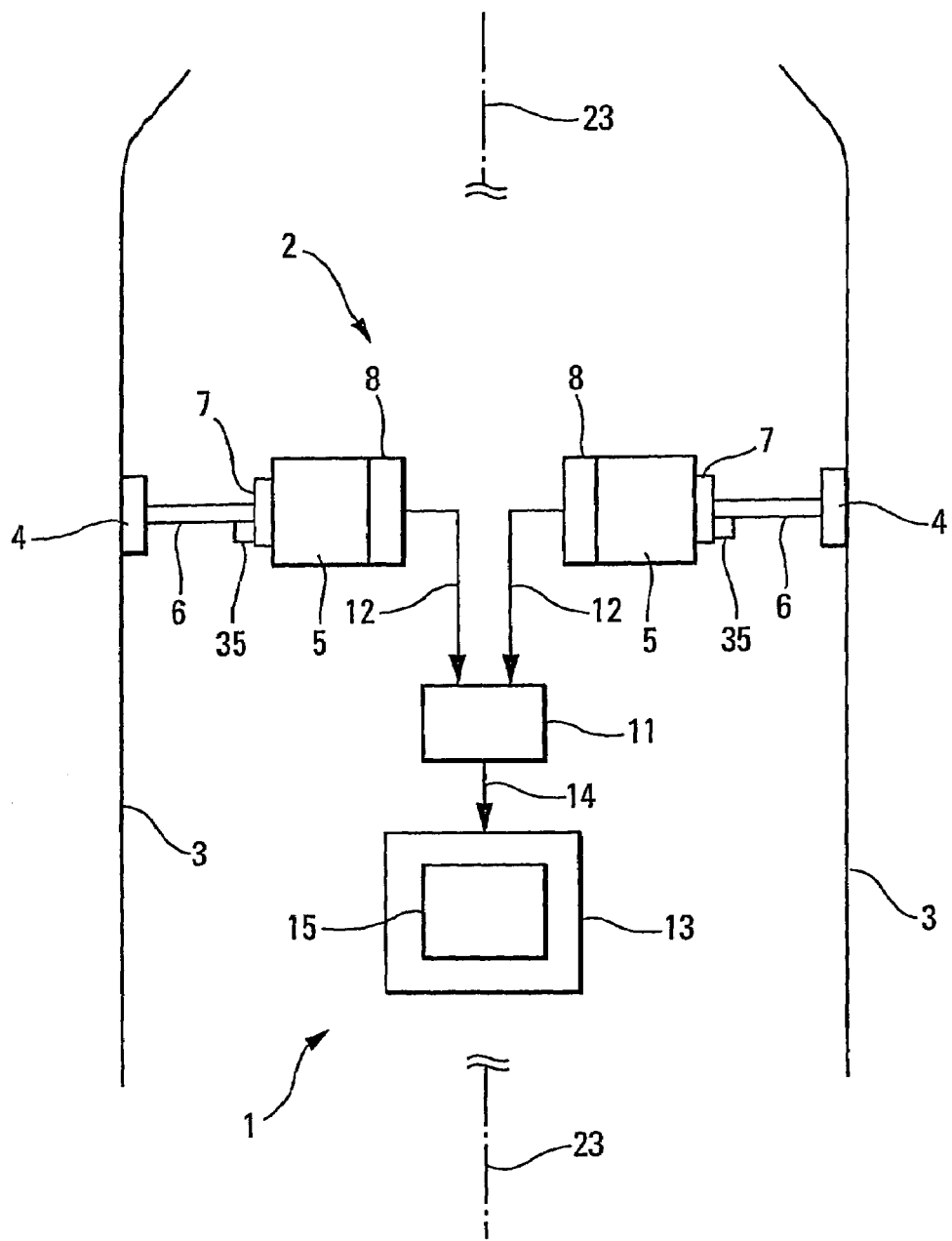
FIG. 1 is the schematic diagram of a device in accordance with the invention.

The device 1 in accordance with the invention and represented diagrammatically in FIG. 1 is intended for monitoring a standard air data system 2 of an aircraft, in particular of a civil transport airplane, of which only a part of the fuselage 3 has been represented in this FIG. 1 for reasons of simplification of the drawing.

It is known that such an air data system 2 is intended for measuring air data making it possible to determine values of parameters such as the altitude, the speed, etc., of the aircraft. To do this, the air data system 2 comprises, in a known manner:

probes 4 which are mounted, in a feed-through manner, on the fuselage 3 of the aircraft and access the exterior;

pressure sensors 5 which are each connected by way of a tube 6 to a probe 4. Generally, such a tube 6 which effects a pneumatic link is connected to the associated pressure sensor 5 by means of a pneumatic connector 7 which makes it possible to disconnect it and reconnect it easily and rapidly. Moreover, with each pressure sensor 5 is associated an analog/digital converter 8; and a central unit 11 which is connected to the pressure sensors 5 by electrical links 12, for example in the form of a communication bus complying with the "ARINC 429" standard.

It is however also conceivable to integrate the pressure sensors 5 into the central unit 11.

Generally, a civil transport airplane comprises three air data systems 2 of this type, of which:

a first provides data which are displayed in the cockpit, for the attention of the pilot;

a second provides data which are also displayed in the cockpit, but for the attention of the co-pilot; and a third is used as backup to cope if necessary with the failure of one of said first and second systems.

For obvious safety reasons, these three air data systems must be made and must operate in a manner which is completely independent of one another, since otherwise the failure of one would have repercussions on the measurements of the other systems.

An object of the device 1 in accordance with the invention is to detect any failure of a pressure sensor 5 of such an air data system 2.

For this purpose, said device 1 comprises:

said central unit 11 which is such as specified hereinbelow; and a means of display 13 which is connected by a link 14 to the central unit 11 and which is able to display, if appropriate, on at least one display device, in particular a standard display screen 15, mounted in the cockpit of the aircraft, a failure cue relating to at least one of said pressure sensors 5 (therefore corresponding to a failure cue relating to said air data system 2).

Figure 2:
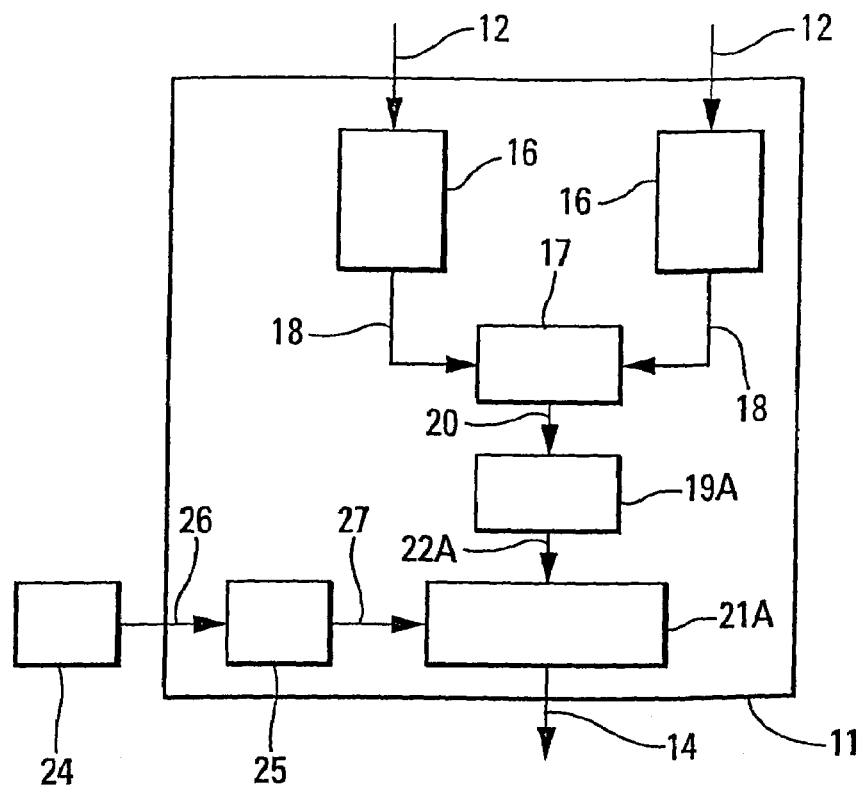
FIGS. 2 and 3 diagrammatically illustrate different modes of implementation of a central unit of a device in accordance with the invention.

According to the invention, said central unit 11 comprises, as represented in FIG. 2:
- data acquisition means 16 that are connected (links 12) to the two pressure sensors 5 of FIG. 1 and that carry out the acquisition of first and second pressure values relating to the measurements made by said two pressure sensors 5 respectively;
- a means of calculation 17 that is connected by links 18 to said data acquisition means 16 and that calculates the deviation between said first and second pressure values;
- a means of comparison 19A that compares this deviation received via a link 20 with a recorded predetermined threshold value, for example 30 mbar; and
- a means of selection 21A that outputs (or otherwise) an order to display a failure cue (which order is transmitted to the display means 13 by the link 14), as a function of the result (received via a link 22A) of this comparison. More precisely, it outputs a display order if said deviation is greater than said threshold value and it outputs no order in the converse case.

Thus, by virtue of the device 1, any failure of a pressure sensor 5 of an air data system 2 can be rapidly and reliably detected, without calling upon information external to this air data system 2, such as for example information output by other air data systems of the aircraft. This therefore makes it possible, should a plurality of air data systems be present on the aircraft, to guarantee the strict mutual independence of the various air data systems.

In a preferred implementation, the two (or at least two) pressure sensors 5 of the air data system 2 are mounted on either side of the longitudinal axis 23 of the fuselage 3 of the aircraft, as represented in FIG. 1.

In a particular implementation, the device 1 moreover comprises, as represented in FIG. 2:
- a standard means 24 for measuring the speed of the aircraft relative to the air so as to obtain an air speed value; and
- a means 25 which is connected by a link 26 to the means 24 for comparing the air speed value thus measured with a predetermined speed threshold, for example 25 m/s (around 50 knots).

In this case, the means of selection 21A which is connected by a link 27 to the means 25 orders the displaying of a failure cue only if, in addition to the aforesaid conditions, said air speed value is greater than said speed threshold.

In another implementation, the device 1 comprises at least three pressure sensors 5 and the calculation unit 11 comprises as many (three, four, etc.) means of acquisition 16 (FIG. 3) as there are pressure sensors 5.

In this case:
- the means of calculation 17 calculates all the possible deviations between the various pressure values taken pairwise;
- the means of comparison 19A compares all the deviations thus calculated with said threshold value; and
- the means of selection 21A orders a possible displaying of a failure cue, as a function of the various comparisons thus carried out.

More precisely, said means of selection 21A orders the displaying of a failure cue:
- in a first variant, if at least one of said deviations is greater than said threshold value; and
- in a second variant, if all said deviations are greater than said threshold value.

Figure 4:
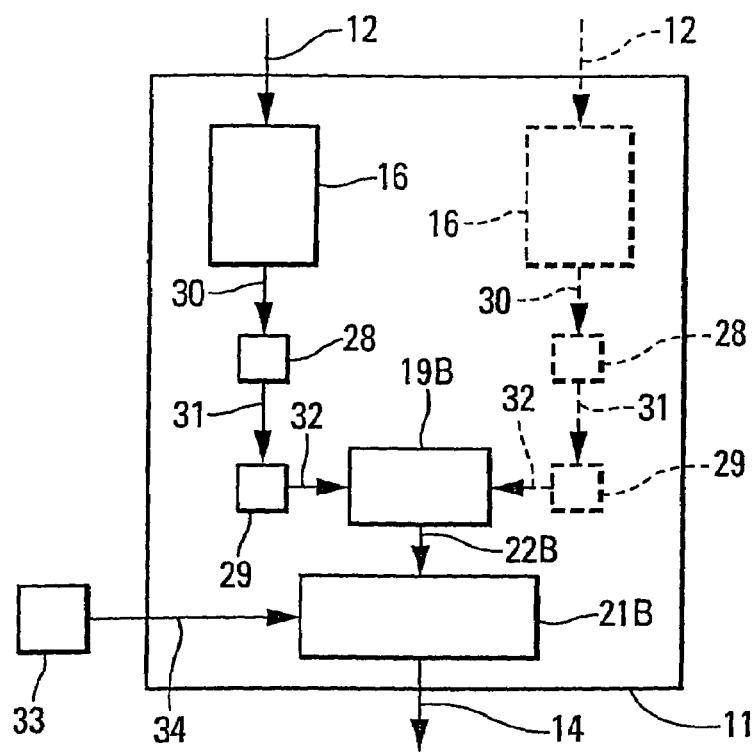
FIGS. 4 and 5 diagrammatically illustrate complementary elements of a central unit of a device in accordance with the invention.

The device 1 can also comprise a means of calculation 28 and a memory 29 that are connected (links 30 to 32) between a means of acquisition 16 and the means of comparison 19B, as represented in FIG. 4.

In this case, the device 1 can employ the following process:
B1) make pressure measurements with the aid of at least one pressure sensor 5 of the air data system 2, on the aircraft which is on the ground and the cabin of which is not pressurized, so as to obtain a third pressure value;
B2) on the basis of this third pressure value, calculate a first altitude corresponding to the ground altitude;
B3) pressurize the cabin (cockpit and passenger cabin) of the aircraft;
B4) make the aircraft take off;
B5) at an instant t0 corresponding to a predetermined time T after takeoff, make pressure measurements with the aid of said pressure sensor 5 so as to obtain a fourth pressure value;
B6) on the basis of this fourth pressure value, calculate a second altitude corresponding to the aircraft's altitude at said predetermined time T after takeoff (that is to say at said instant t0);
B7) calculate a third altitude corresponding to the aircraft's altitude with respect to the ground, from said first and second altitudes;
B8) compare said third altitude with a predetermined altitude threshold; and
B9) if said third altitude is less than said predetermined altitude threshold, order the displaying of a failure cue relating to said air data system 2 on the display device 15.

Preferably, said altitude threshold is less than the altitude reached by the aircraft, at said predetermined time after takeoff, should there be a fault with an engine of the aircraft (which is, in this case, fitted with at least two engines).

By way of illustration, said predetermined time T after takeoff can be substantially equal to 30 seconds, and said altitude threshold can be substantially equal to 30 meters (around 100 feet).

The device 1 can also comprise standard means 33 for monitoring the engines of the aircraft. These means 33 are connected to the means of selection 21B by a link 34 so as to inform it of any detection of a malfunction of at least one of the engines of the aircraft. In this case, when a failure of a pressure sensor 5 is discerned, the means of selection 21B orders the displaying of a failure cue only if no malfunction of an engine is signaled at the same time by the means 33.

Figure 3:
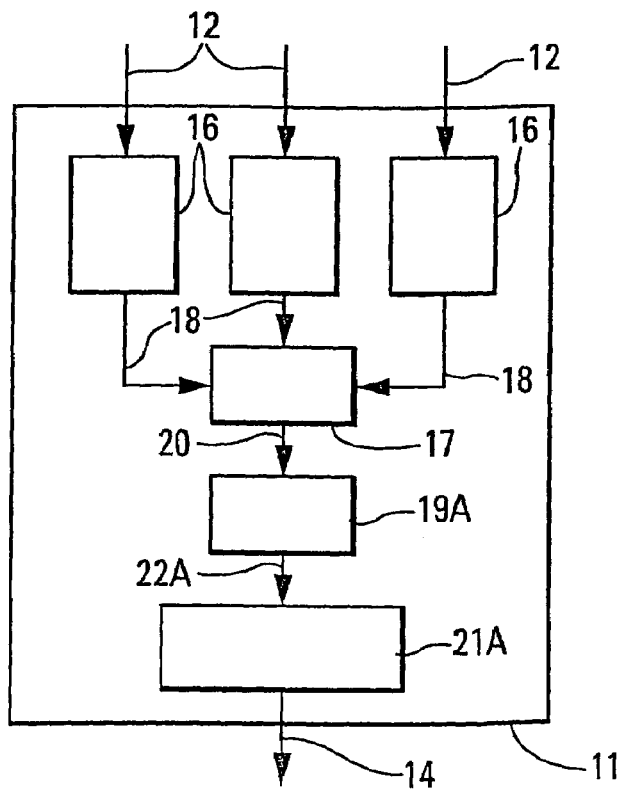

It will be noted that the elements 19B, 21B and 22B of FIG. 4 can correspond to the elements 19A, 21A and 22A of FIGS. 2 and 3. However, they may also be means separate from said central unit 11.

The mode of implementation of FIG. 4 has the advantage of allowing the detection of the failure of two pressure sensors 5 of the same air data system 2. For this purpose, it can comprise additional elements 16, 28 and 29, as is illustrated by broken lines.

Figure 5:
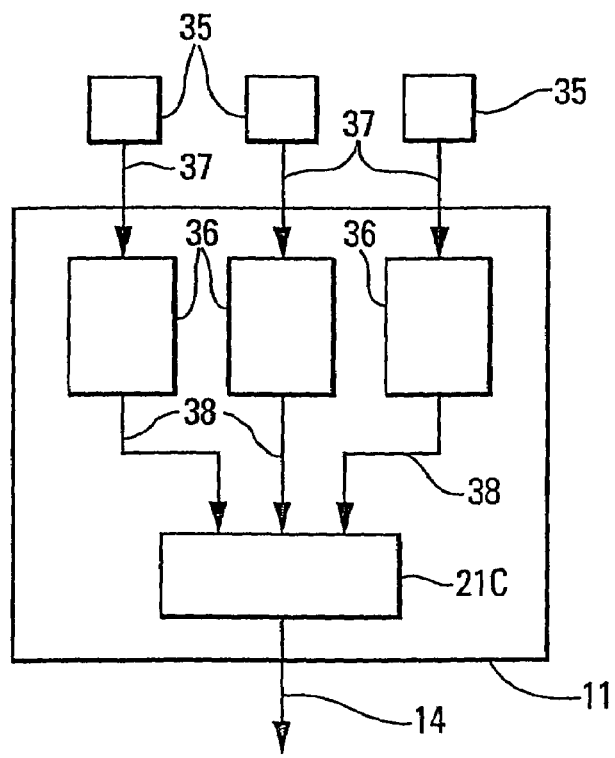

According to the invention, at least one detector 35 which is able to detect a failed coupling between the corresponding pressure sensor 5 and the probe 4 which is associated with this pressure sensor 5 can also be provided on at least some of the pressure sensors 5 (FIGS. 1 and 5).

In this case, the central unit 11 moreover comprises, as is represented in FIG. 5:
- data acquisition means 36 that are connected by links 37 to said detectors 35 and that carry out the acquisition on the ground, before takeoff, of information relating to the coupling, which originates from said detectors 35; and a means of selection 21C which is connected by links 38 to said data acquisition means 36 and which orders, if at least one of said detectors 35 signals a failed coupling, the displaying of a failure cue relating to the air data system 2 on said display device 15.

In a preferred implementation, at least one of said detectors 35 is integrated into a pneumatic connector 7 intended to join a pneumatic tube 6 associated with a probe 4 to the corresponding pressure sensor 5. A detector 35 can in particular be a switch actuated by the coupling of the connector 7, a laser diode, etc.

Furthermore, the means of selection 21C can represent the means of selection 21A and/or the means of selection 21B, or else be independent of them.

The invention claimed is:

1. A process for detecting the failure of a pressure sensor of an air data system of an aircraft, which comprises at least two pressure sensors, wherein at least the following first series of steps is carried out:
   A1) making pressure measurements with the aid of said two pressure sensors so as to obtain, respectively, first and second pressure values;
   A2) calculating the deviation between said first and second pressure values;
   A3) comparing and deviation with a predetermined threshold value; and
   A4) if said deviation is greater than said threshold value, displaying a failure cue relating to said air data system on a display device which is mounted on said aircraft.

2. The process as claimed in claim 1, wherein the following steps are moreover carried out:
   measuring the speed of the aircraft relative to the air in such a way as to obtain an air speed value;
   comparing the air speed value with a predetermined speed threshold; and
   displaying a failure cue in step A4), only if said air speed value is greater than said speed threshold.

3. The process as claimed in claim 2, wherein said speed threshold is substantially equal to 25 m/s.

4. The process as claimed in claim 1, wherein said threshold value is substantially equal to 30 mbar.

5. The process as claimed in claim 1, wherein said two pressure sensors are mounted on either side of the longitudinal axis of the aircraft, on the fuselage of the latter.

6. The process as claimed in claim 1, wherein at least three pressure sensors are provided for said air data system, wherein in step A1), pressure measurements are made with the aid of said three pressure sensors, wherein in step A2), all the possible deviations between the various pressure values taken pairwise are calculated, wherein in step A3), all the deviations thus calculated are compared with said threshold value, and wherein in step A4), a failure cue is or is not displayed depending on the various comparisons thus carried out.

7. The process as claimed in claim 6, wherein in step A4), a failure cue is displayed if at least one of said deviations is greater than said threshold value.

8. The process as claimed in claim 6, wherein in step A4), a failure cue is displayed only if all said deviations are greater than said threshold value.

9. The process as claimed in claim 1, wherein at least the following second series of steps is moreover carried out:
   B1) making pressure measurements with the aid of at least one pressure sensor of the air data system, on the aircraft which is on the ground and the cabin of which is not pressurized, so as to obtain a third pressure value;
   B2) on the basis of this third pressure value, calculating a first altitude corresponding to the ground altitude;
   B3) pressurizing the cabin of the aircraft;
   B4) causing the aircraft to take off;
   B5) at a predetermined time after takeoff, making pressure measurements with the aid of said one pressure sensor so as to obtain a fourth pressure value;
   B6) on the basis of this fourth pressure value, calculating a second altitude corresponding to the aircraft's altitude;
   B7) calculating a third altitude corresponding to the aircraft's altitude with respect to the ground, from said first and second altitudes;
   B8) comparing said third altitude with a predetermined altitude threshold; and
   B9) if said third altitude is less than said predetermined altitude threshold, displaying a failure cue relating to said air data system on the display device.

10. The process as claimed in claim 9, wherein, in the case of an aircraft fitted with at least two engines, said altitude threshold is less than the altitude reached by the aircraft, at said predetermined time after takeoff, should there be a fault with at least one of said engines.

11. The process as claimed in claim 10, wherein said predetermined time after takeoff is substantially equal to 30 seconds, and wherein said altitude threshold is substantially equal to 30 meters.

12. The process as claimed in claim 9, wherein the following steps are moreover carried out:
   monitoring the operation of engines of the aircraft; and
   when a malfunction of at least one of the engines of the aircraft is detected, a failure cue is not displayed if appropriate in step B9).

13. The process as claimed in claim 1, wherein at least the following third series of steps is moreover carried out:
   C1) providing on at least one of the pressure sensors at least one detector that is able to detect a failed coupling between the corresponding pressure sensor and a probe of the air data system, which is associated with said correspoinding pressure sensor;
   C2) performing acquisition on the ground, before takeoff, of cues relating to said coupling, which emanate from said detectors; and
   C3) if at least one of said detectors signals a failed coupling, displaying a failure cue relating to said air data system on the display device.

14. The process as claimed in claim 13, wherein at least one of said detectors is integrated into a pneumatic connector intended to join a pneumatic tube, associated with the corresponding probe, to the corresponding pressure sensor.

15. A device for detecting a failure of the process sensor of an air data system of an aircraft, which comprises at least two pressure sensors, said device comprising:
   an acquisition section that acquires values of measurements made by said pressure sensors so as to obtain, respectively, first and second pressure values;
   a calculation section that calculates the deviation between said first and second pressure values;
   a comparison section that compares said deviation with a predetermined threshold value;
   a selection section that outputs an order to display a failure cue, if said deviation is greater than said threshold value; and a display section that displays, on at least one display unit which is mounted on said aircraft, a failure cue relating to said air data system.

16. A device for detecting a failure of a pressure sensor of an air data system of an aircraft, which comprises at least two pressure sensors, said device comprising:

means for acquiring values of measurements made by said pressure sensors so as to obtain, respectively, first and second pressure values;

means for calculating the deviation between said first and second pressure values;

means for comparing said deviation with a predetermined threshold value;

means for selecting and outputting an order to display a failure cue; if said deviation is greater than said threshold value; and means for displaying, on at least one display device which is mounted on said aircraft, a failure cue relating to said air data system.

* * * * *